United States Patent [19]

Moore

[11] 3,924,998

[45] Dec. 9, 1975

[54] BLOW MOLDING APPARATUS HAVING SIDE DISCHARGE OF FINISHED ARTICLES

[75] Inventor: Lawrence A. Moore, Rockford, Ill.

[73] Assignee: Beloit Corporation, Beloit, Wis.

[22] Filed: Aug. 17, 1972

[21] Appl. No.: 281,302

[52] U.S. Cl..... 425/387 B; 425/437; 425/DIG. 204; 425/DIG. 213; 425/DIG. 232
[51] Int. Cl.$^2$.......................................... B29D 23/03
[58] Field of Search....... 425/437, 387 B, DIG. 204, 425/DIG. 213, DIG. 232

[56] References Cited
UNITED STATES PATENTS

| | | | |
|---|---|---|---|
| 3,084,382 | 4/1963 | Stuchbery | 425/387 B |
| 3,271,489 | 9/1966 | Fogelberg et al. | 425/387 B |
| 3,390,427 | 7/1968 | Ruekberg | 425/DIG. 232 |
| 3,496,597 | 2/1970 | Ayres | 425/437 X |
| 3,587,133 | 6/1971 | Valyi | 425/DIG. 232 |
| 3,616,491 | 11/1971 | Vollers | 425/242 B |
| 3,632,264 | 1/1972 | Butcher | 425/387 B |
| 3,687,593 | 8/1972 | Gilbert | 425/387 B |
| 3,721,514 | 3/1973 | Harris | 425/387 B |

FOREIGN PATENTS OR APPLICATIONS

| | | | |
|---|---|---|---|
| 200,710 | 2/1956 | Australia | 425/DIG. 232 |
| 866,378 | 4/1961 | United Kingdom | 425/DIG. 232 |
| 430,161 | 8/1967 | Switzerland | 425/DIG. 232 |
| 1,170,301 | 9/1958 | France | 425/DIG. 232 |

Primary Examiner—Francis S. Husar
Assistant Examiner—Carl Rowold
Attorney, Agent, or Firm—Larson, Taylor and Hinds

[57] ABSTRACT

In a blow molding apparatus in which preforms are heated in an oven, transferred to a blow mold and formed in the blow mold into a finished article, an arrangement for discharging finished articles from the blow mold. The finished articles are urged horizontally to the side into a receiving device such as a trough. The trough may be arranged to receive both finished articles and scrap pieces and both convey away the finished articles and dispose of the scrap pieces. Preferably, air blasts or jets are used both to clear scrap from the base on which the preform rests as the article is being formed and also to blow the finished article off of this base to the receiving device.

15 Claims, 6 Drawing Figures

BLOW MOLDING APPARATUS HAVING SIDE DISCHARGE OF FINISHED ARTICLES

BACKGROUND OF THE INVENTION

This invention relates to a blow molding apparatus of the type in which an initially cool preform is heated, transferred to a blow mold, and then formed into a finished article at the blow mold, and in particular it relates to an improved arrangement for discharging finished articles from the blow mold in this type of apparatus.

Numerous products such as foods, liquid soaps, etc. are now packaged and sold in non-breakable containers, commonly referred to as "plastic bottles". These containers, which are commonly made from a polyolefin such as polypropylene are normally manufactured, inter alia, by extruding the material into an elongated endless hollow tube. Cut pieces of the tube, referred to as parisons, are used to form the said plastic bottles by blow molding techniques. Since the parisons must be hot when they are formed into bottles, the original technique was to take the parisons, as soon as they were formed by the extrusion apparatus, and while they were still hot, and to transfer them directly to the blow molding apparatus whereat they were stretched and molded into the desired shape. However, it has been found undesirable to necessarily link together the process of forming the parisons and the process of forming bottles from the parisons. To the contrary, it has been found more desirable to separate these two functions. The parisons can then be formed into bottles at a later time or they can be sold to others who may have facilities for forming bottles from parisons but who may not have facilities for initially forming the parisons. The separation of these two functions of course means that the process of forming the bottles must start with cold parisons which must first be heated. Consequently, this technique has become known as the cold parison technique.

Another approach to the formation of finished articles from previously produced preforms is described in my U.S. Pat. No. 3,661,489. As described in that application, the preforms can be produced in the shape of a disc. For example, a sheet could be extruded and discs could be punched out of such a sheet. Preforms may take other shapes such as partially concave discs. These latter preforms would be used for example to form by blow molding a wide mouth jar.

The formation of articles such as wide mouth jars from other shapes of preforms such as discs can follow a procedure analagous to the cold parison procedure outlined above. That is, the discs can first be formed and then cooled; and then at a subsequent time and/or at a subsequent location heated up, transferred immediately to a blow molding station and formed thereat into the finished article.

Although numerous different materials may be used, for convenience this specification will refer specifically to polypropylene.

My U.S. Pat. No. 3,765,813, discloses and claims a new and improved apparatus for heating and blow molding parisons into articles by the cold parison blow molding technique. In the method and apparatus as disclosed and claimed in said application, the cold parisons were first heated in an oven and then transferred by a suitable transfer arm directly from the oven to a blow molding station whereat the bottom of the parison was grasped, the parison was stretched, and the blow mold halves closed onto the parison which was then formed into a finished article in the closed blow mold. As disclosed and claimed in said application, the finished articles were discharged from the blow mold in the following manner. As the mold halves separated, the air stream urged the finished container upwardly into a suction discharge tube, the open mouth of which was positioned immediately above the blow mold.

However, while this discharge device has proved satisfactory in many respects, it has now been found that several disadvantages also exist. Firstly, this previous discharge device tends to be rather complex. As indicated above, the open mouth of the suction tube must be positioned immediately over the finished article during the discharge thereof. However, obviously the said open mouth of the discharge tube cannot be located in that position permanently. It must be moved to the side once during each cycle of operation to permit the transfer arm to move to the space above the mold station to deliver a new, heated parison. Considerable complexity is therefore required to assure proper synchronization of the transfer arm and suction tube movements. Added complexity also means added expense. In addition, it has been found that to create a sufficient force to urge the finished article upwardly into the suction tube, a rather large air blast was required and this tended to damage the bottom of many of the finished articles. Finally, as a result of the complexity and damage mentioned above, the entire discharge process tended to be less efficient than would be desired.

Thus, there exists a need for a new and improved finished article discharge arrangement in a blow molding apparatus of the type described.

SUMMARY OF THE INVENTION

Thus, it is a purpose of this invention to provide, in a blow molding apparatus of the type described, a new and improved arrangement for discharging finished articles from the blow molding station.

For convenience, the present invention will be described with particular reference to an apparatus such as that disclosed and claimed in my said U.S. Pat. No. 3,765,813, in which parisons are heated and blow molded. However, it will be understood that the invention is equally applicable to apparatus in which preforms of other shapes are heated and formed into a finished article, such as disclosed and claimed in my said U.S. Pat. No. 3,661,489.

This purpose of the invention is achieved by providing an arrangement in which after the article has been formed and the mold halves have separated, a force is exerted laterally against the side of the finished article urging the same off of the base and into a receiving means. Preferably, this lateral force exerting means will include one or more jets of air of sufficient magnitude to tip the bottle over so that it can fall onto the receiving means. Preferably, a series of jets will be provided at the base, i.e. at a height equal to the height of the bottom of the preform. These air jets will blow across the base clearing this area of any scraps. Concurrently, a further air jet will blow against the upper part of the finished article to tip the same over. This further jet may be located at a height adjacent the upper part of the finished article and blow horizontally against the finished article. Alternatively, this further jet can be located near the said base but with its opening directed upwardly against the upper part of the finished article.

The article, thus discharged, is received on an inclined surface which carries it into a trough. Preferably, this trough is constructed to dispose of scrap material through an adjustable size slot located in the bottom thereof and concurrently permit finished articles to be conveyed away through an opening in the end thereof, into a suction tube.

When the discharge arrangement of the present invention is employed in combination with the apparatus disclosed and claimed in my said U.S. Pat. No. 3,765,813, the path of the transfer arm between the oven and the blow mold will pass over the said inclined ramp so that on its return travel back to the oven it can drop off the scrap still held by it which scrap can then be received on the inclined ramp and fall into the trough and be disposed of through said opening. A suitable container can be provided beneath the trough for receiving said scrap material.

Thus, it is an object of this invention to provide a new and improved blow molding apparatus of the type in which a preform is heated, transferred to a molding station, blow molded into a finished article, and discharged.

It is another object of this invention to provide an improved blow molding apparatus of the type described in which new and improved means are provided for discharging the finished articles.

It is another object of this invention to provide, in a blow molding apparatus of the type described, a new and improved arrangement for discharging finished articles wherein a means is provided for applying a force to the finished article to move it sideways off of its base at the mold station and into a receiving means.

It is another object of this invention to provide a new and improved blow molding apparatus of the type described in which air blasts are used to urge the finished molded article sideways out from between the mold halves and into a receiving means.

It is another object of this invention to provide, in a blow molding apparatus of the type described, a new and improved arrangement for discharging finished articles sideways, including a trough for concurrently receiving and disposing of both finished articles and scrap material.

It is another object of this invention to provide, in a blow molding apparatus of the type wherein tubular parisons are heated in an oven and carried by a transfer arm to a blow molding station, an arrangement in which the containers formed by the blow mold are urged sideways into a receiving means which concurrently receives scrap material from the transfer arm as the latter moves from the mold back to the oven.

Other objects and advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings.

DETAILED DESCRIPTION OF THE PREFERRED EMBODIMENTS

Figures 1, 6:
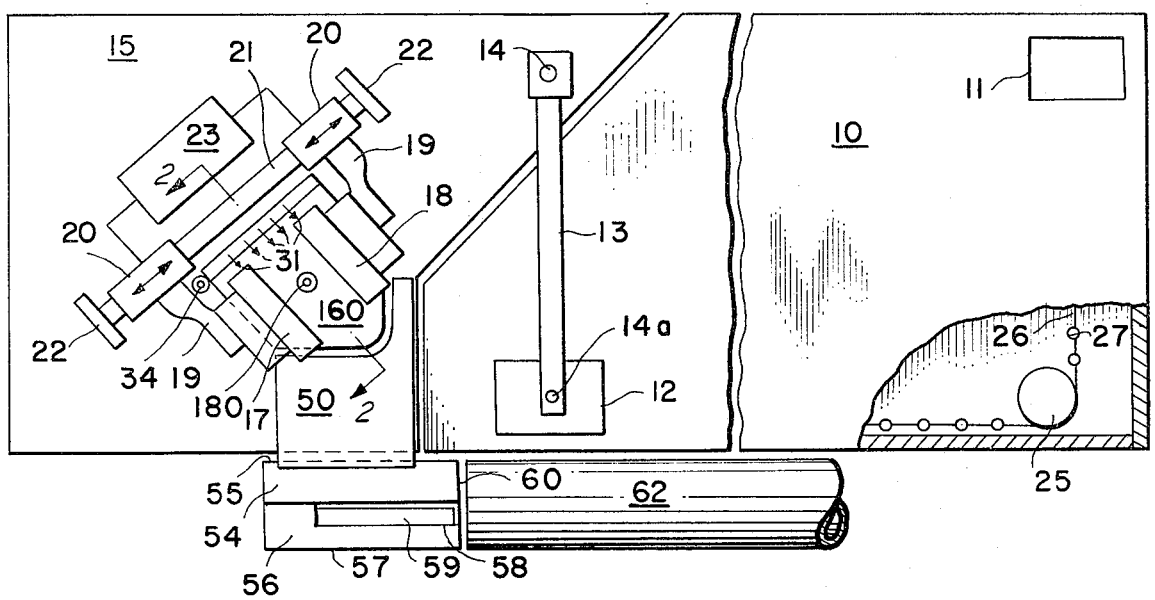
FIG. 1 is a plan view of a blow molding apparatus similar to that disclosed and claimed in my said U.S. Pat. No. 3,765,813, but modified to include the new and improved discharge arrangement of the present invention.
FIG. 6 is an end elevation view taken along line 6—6 of FIG. 4.

Referring now to the drawings, like numerals represent like elements throughout the several views.

FIG. 1 illustrates schematically a parison heating oven 10. The details of this oven including the means for loading parisons into the oven and discharging parisons from the oven as well as the details of the transfer arm and the mold station are described in detail in my said U.S. Pat. No. 3,765,813. Therefore, said application Ser. No. 3,003 is incorporated herein by reference for such details. As shown schematically in FIG. 1, the oven 10 includes a parison loading station 11 at which parisons are loaded into the oven. In the oven there is provided an endless chain 26, a portion of which is visible in FIG. 1, which carries a plurality of parisons 27, some of which are visible in FIG. 1, along an endless path back and forth through the oven while the parisons are being heated. Finally, the properly heated parisons arrive at discharge station 12. At this point a transfer arm 13 which is movable vertically and also about axis 14 moves down into the oven whereat a gripper means, the axis 14a of which is shown in FIG. 1, grasps the heated parison. The transfer arm is then raised vertically after which the arm is rotated about axis 14 to carry the parison immediately over the plug 180 centered between the mold halves. At this point the parison is lowered and gripped by means to be described immediately below.

Figure 2:
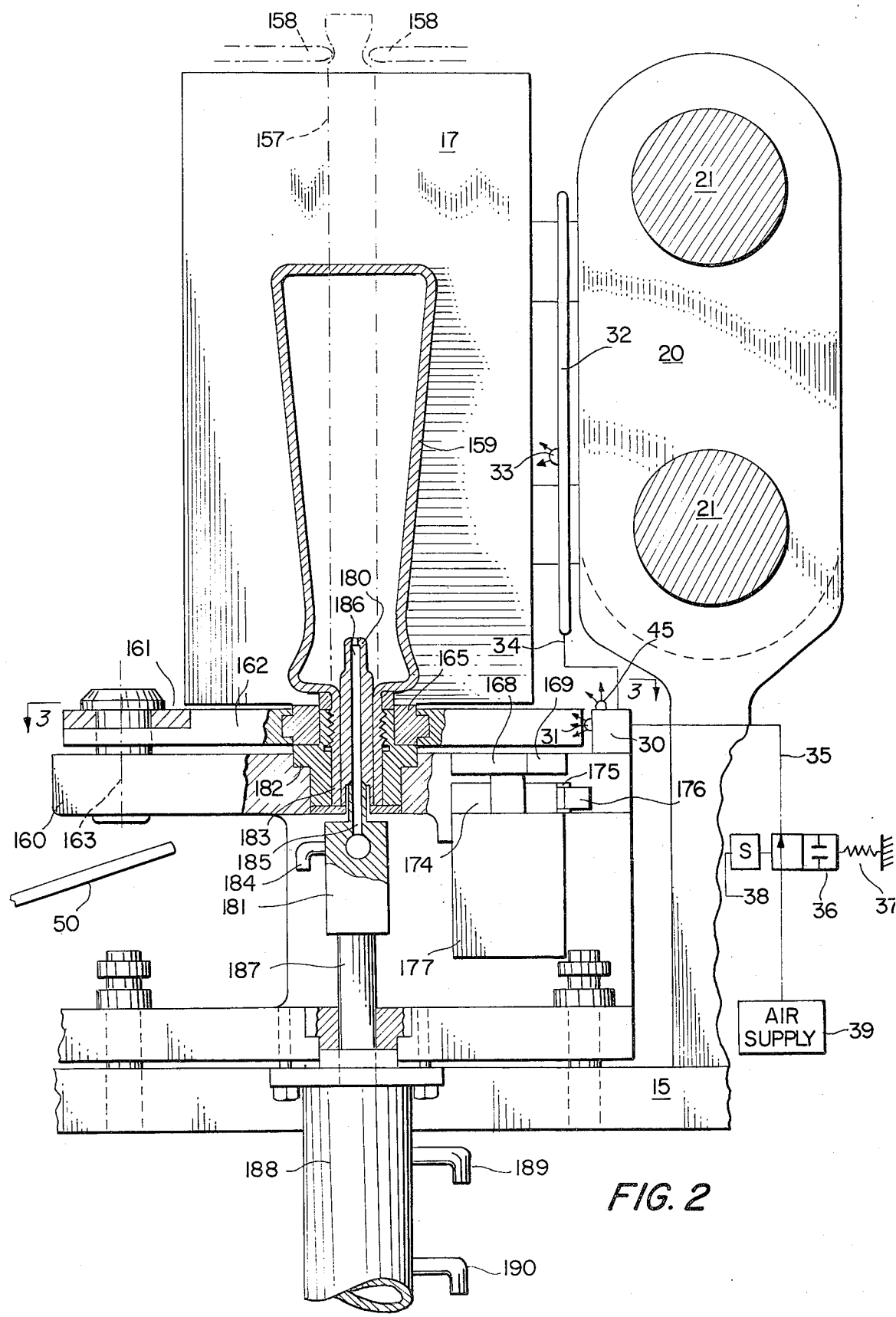
FIG. 2 is a greatly enlarged sectional view of the mold station, taken along line 2—2 of FIG. 1.
Figure 3:
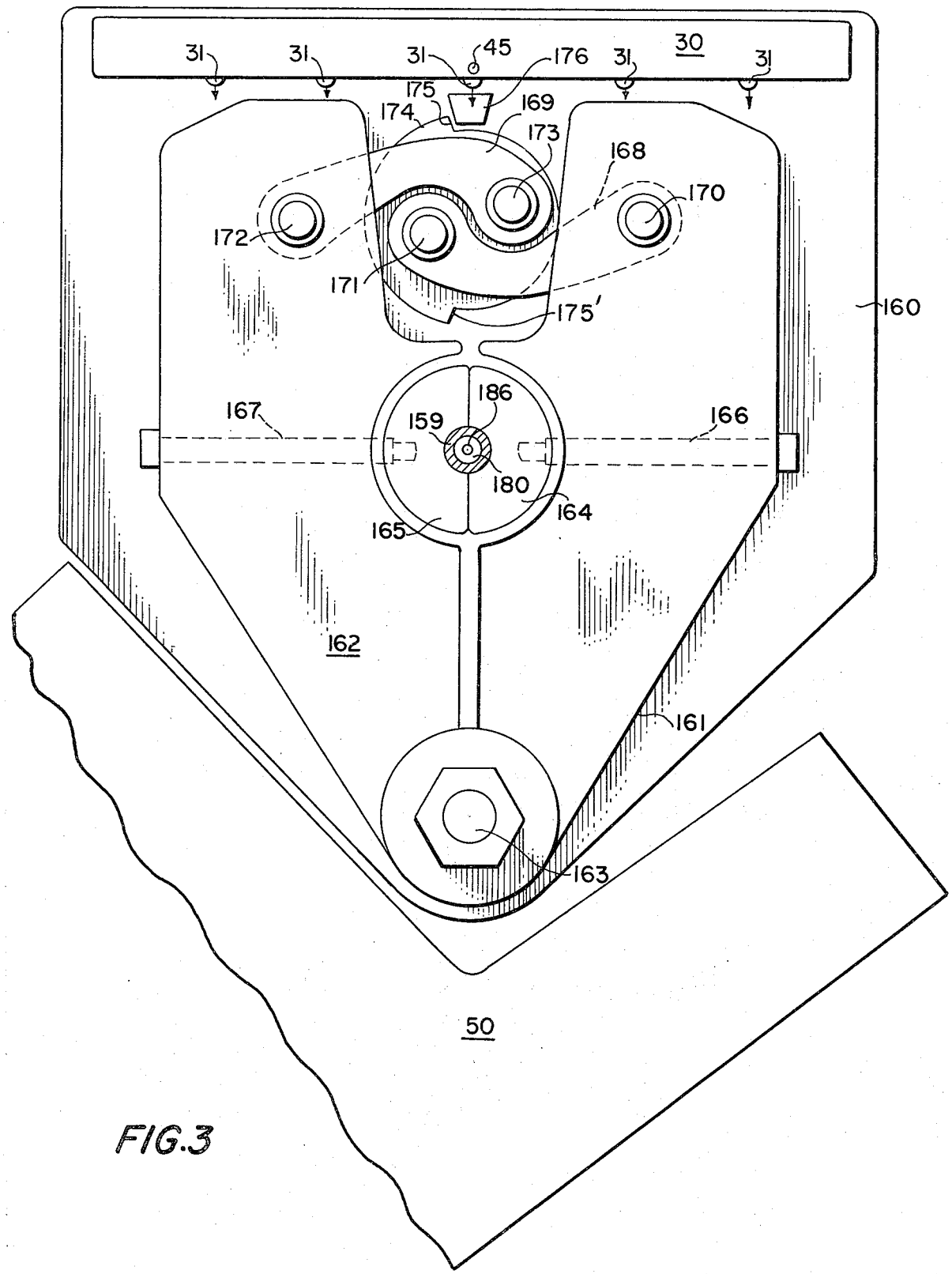
FIG. 3 is a horizontal sectional view of the base of the mold station, taken along line 3—3 of FIG. 2.

The mold station itself is illustrated in FIG. 1, and also in FIGS. 2 and 3. A base 160 has an opening in the center thereof through which plug 180 moves upwardly to receive the bottom of the parison. A pair of mold halves 17 and 18 move over the base 160 towards each other to close onto the parison and away from each other to a separated, open position which is shown in FIG. 1. The mold halves are connected to brackets 19 which are in turn fixed to support blocks 20 which ride along rails 21 in a first direction corresponding to the direction of the arrows, these rails 21 being fixed at their ends to fixed frame members 22. Suitable means are provided for moving the blocks 20 towards and away from each other to close and open the mold. This actuating means is shown schematically in FIG. 1 as element 23. In practice, this actuating means can take any form, for example the rotary actuating means shown in my said U.S. Pat. No. 3,765,813, or the fluid operated clamping device shown in my U.S. Pat. No. 3,807,929.

In the vicinity of the said plug 180, several manipulations occur with respect to the parison. Firstly, a thread assembly grasps the bottom of the parison. This thread assembly performs a number of functions. First, as indicated by the name, it forms the bottom of the parison into the shape of thread which of course will constitute the threads at the top of the finished container. Secondly, the thread dies on the outside of the bottom cooperate with the plug which is moved upwardly into the bottom of the parison to firmly grasp and hold the bottom of the parison while the grippers of the transfer arm 13 move upwardly to stretch the parison just prior to the blow molding step. In addition, the thread assembly in combination with the plug forms an airtight closure at the bottom of the parison for the passage of pressure air into the parison through the plug when the mold is closed to form the finished article.

Referring now generally to FIGS. 2 and 3, the thread assembly includes a thread assembly frame 160 which is mounted directly on the platform 15 by suitable bolts or the like. As best shown in FIG. 3, the thread forming means includes a pair of arms 161 and 162 rotatable about the axis 163, this axis also being shown clearly in FIG. 2. A thread die 164 is connected to a semi-circular recess formed in the arm 161 and held there by a bolt 166 which passes completely through the arm 161. This bolt is shown in FIG. 3. Similarly, a mating thread die 165 is mounted in a semi-circular recess formed in the arm 162 and held there by a similar bolt 167. The two arms 161 and 162 are urged together and separated by any suitable mechanism. In the thread assembly, this means includes a pair of toggle levers 168 abd 169, the former attached to arm 161 at pivot 170 and the latter attached to arm 162 at pivot 172. Beneath the levers 168 and 169 is a rotating disc 174. This disc has a pair of abutment edges 175 and 175' which limit the clockwise and counterclockwise rotational movement of the disc 174, respectively, by engagement with an abutment member 176. Lever 168 is connected to the disc 174 at pivot connection 171 and lever 169 is connected to the disc 174 at pivot connection 173. Only a small component of the force tending to separate the arms 161 and 162 is effective to urge separation of the levers 168 and 169. Turning movement of disc 174 is provided by a rotary motor 177.

Also included in the thread assembly is a vertically movable plug member and a means for introducing air under pressure when the mold halves are closed to form the stretched parison 157 held by gripper fingers 158 of the transfer arm 13 into the container 159. This apparatus includes a plug 180 which is movable vertically to the raised position as shown in solid lines in FIG. 2 and to a lowered position whereat the top of plug 180 is below the opening in container 159. This plug is connected to an adaptor member 181 and is surrounded by a bushing 183 which slidingly supports the plug 180 and a wear plug 182, the latter being held firmly within the frame 160. An air line 184 delivers pressurized air to a passage 185 in the adaptor 181 which in turn delivers air to a passage 186 in the plug 180. At the appropriate times, as will be explained in detail below, air under pressure is introduced through this line 184 and hence into the container 159.

Vertical movement of the plug 180 is provided by a double acting hydraulic cylinder and piston unit 188 which is supplied at its respective ends with fluid under pressure through lines 189 and 190. This cylinder 188 is connected to the adaptor 181 through a suitable rod 187.

After the finished article 159 has been formed, the mold halves 17 and 18 are separated from each other. At this time, a valve 36 (see FIG. 2) which is normally held in a closed position by spring 37 is urged to an open position by a solenoid 38 which operates in synchronism with the movement of the mold halves. With the valve 36 open, pressurized air is delivered from a supply 39 through a line 35 to an air manifold 30 and through an air tube 34 to an upper air rod 32 from which the air passes through air jet 33.

After the container 159 has been formed and the mold halves 17 and 18 separate from each other, the thread die arms 161 and 162 separate from each other and the plug 180 is in a lowered position. At this time, a small quantity of air is delivered through opening 186, just enough to lift the container 159 to clear the thread die assembly. At this time, means to be described exert a force in a second direction transverse to the said first direction in which the mold halves move to remove the finished article. The valve 36 opens, whereby blasts of air from jets 31 clear the area of base 160 of any scrap, crumbs or the like while the air from jet 33 tips the container 159 over onto inclined ramp 50. In addition, the air from jets 31 of course assist in moving the finished article off of the base.

In an alternative arrangement, the tube 34, the air rod 32 and the jet 33 may all be replaced by a further air jet 45 located on the top of manifold 30 and arranged to direct air upwardly against the upper part of container 159 to tip the same over in the same manner as the air emanating from jet 33.

Figure 4:
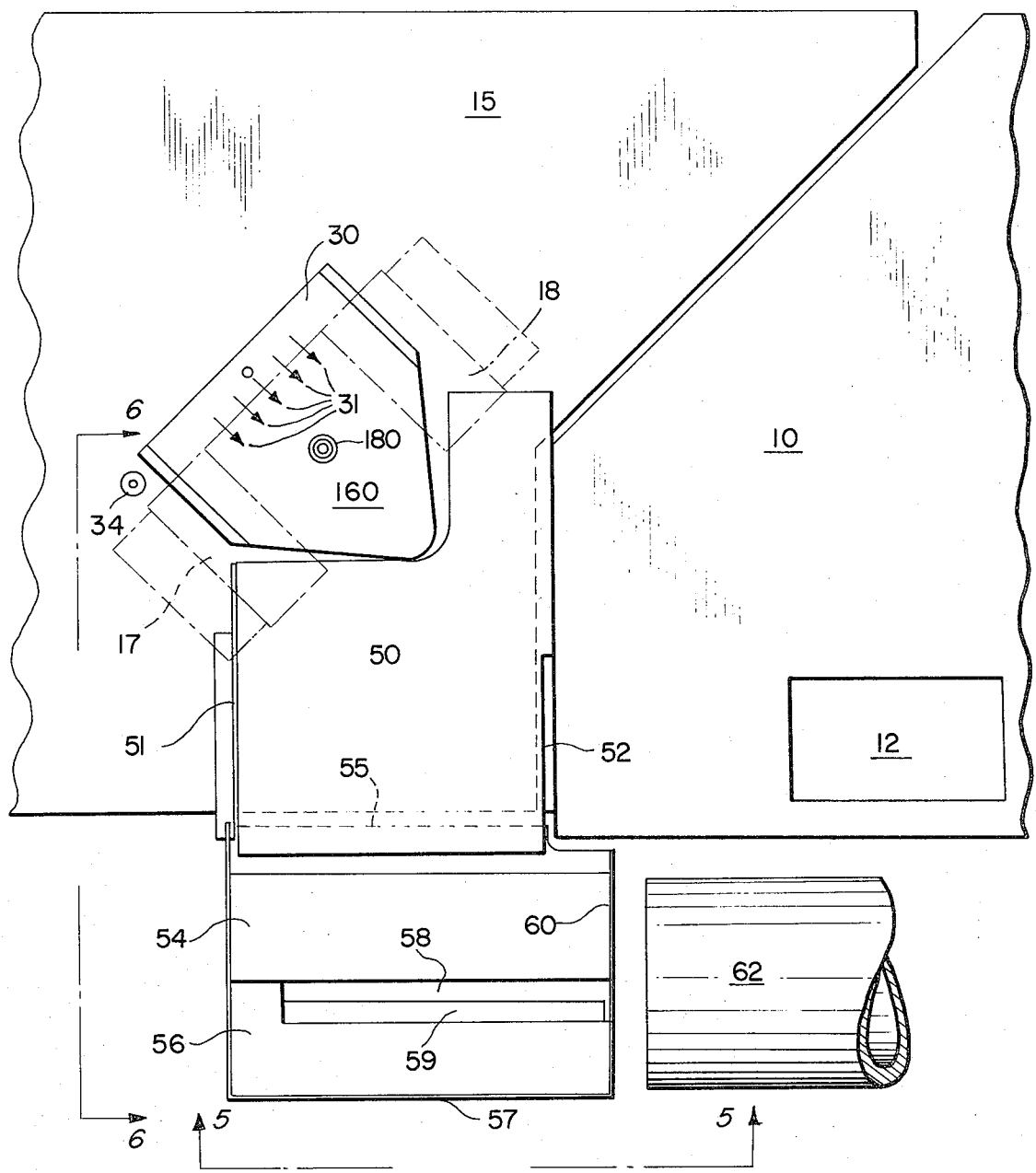
FIG. 4 is a plan view similar to FIG. 1 but greatly enlarged and wherein the mold halves and the frame therefor and the transfer arm have been omitted for purposes of clarity.
Figure 5:
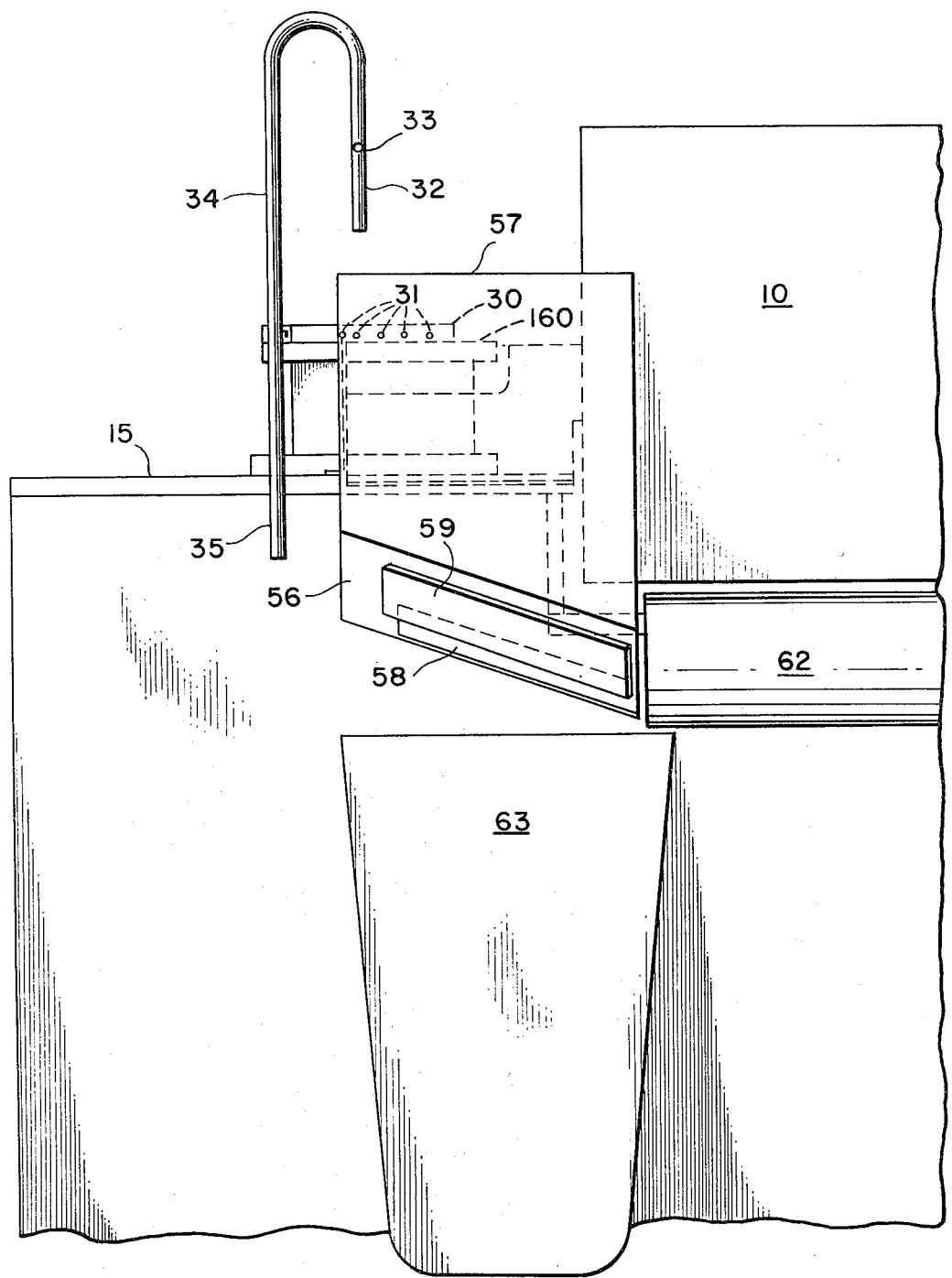
FIG. 5 is a side elevation view taken along line 5—5 of FIG. 4.

The inclined ramp 50 and its associated elements for receiving the finished article are shown most clearly in FIGS. 4–6. The inclined ramp 50 includes a raised side wall 51 which, together with the vertical side wall of the oven 10 on the opposite side of ramp 50 forms a channel for guiding the finished bottles down the ramp 50. On the side of ramp 50 adjacent the oven 10, there is provided a downward projecting flange, the bottom of which rests on platform 15. By suitable connecting means, such as bolts or the like, not shown, this flange 52 can be firmly connected to the side of oven 10, thereby firmly positioning the ramp 50.

At the downstream end of ramp 50 there is provided a trough 53 having an inner sloped bottom 54 with a lip 55 at the upper end thereof, which lip is located just beneath the outlet end of ramp 50, thereby assuring the smooth flow of articles from the ramp 50 into the trough 53. The trough 53 further includes an outer sloped bottom 56 and an outside stop wall 57. Finished articles travelling down ramp 50 at a high speed will be stopped by wall 57 after which the finished articles will fall to the bottom of trough 53. The outer sloped bottom 56 includes a slot 58 and a cover 59 slidable over the opening 58 to adjust the size of the slot. This slot 58 is intended to receive scrap and of course the cover 59 will be positioned depending upon the size of the scrap which it is desired to pass through slot 58. A container 63 is provided beneath the slot 58 for receiving scrap material.

As is evident from FIG. 5, the trough 53 extends downwardly towards an end wall 60 which has an opening 61 at the lower end thereof. This opening is dimensioned such that finished articles can pass therethrough. Adjacent opening 61 is a tube 62 positioned to receive the finished articles passing through opening 61 for transporting said finished articles to a remote collection station. Preferably, a suction will be applied to the interior of tube 62 for pulling the finished articles through opening 61 and to said collection station.

Although the operation of the invention will be apparent from the preceding detailed description of the preferred embodiments, the operation will be briefly summarized for purposes of clarity.

After a parison has been properly heated in oven 10 and reaches the discharge station 12, the arm 13 will be lowered such that grippers 158 (see FIG. 6) reach into the oven to grip the heated parison. The arm 13 is then raised and turned about axis 14 until the parison is over plug 180. The parison is then lowered onto plug 180. The thread assembly then closes onto the bottom of the parison against the raised plug 180 firmly grasping the bottom of the parison. The arm 13 is then raised to stretch the parison. The stretched unformed parison is shown at 157 in FIG. 2. The mold halves 17 and 18 are then closed against each other under the action of actuating means 23. As the mold halves 17 and 18 close against each other, the upper part thereof severs the parison leaving a portion inside the closed mold which portion is closed at its upper end and which portion is held at its lower end by the thread assembly and the plug 180. The transfer arm 13 is then raised and swung back to its position as shown in FIG. 1, meanwhile operating the grippers 158 to release the upper strap portion as the arm 13 passes over ramp 50. This scrap material then passes through slot 58 into container 63.

Meanwhile, as soon as the mold has closed, air through opening 186 in the plug 180 fills the interior of the parison forming the same into the finished article 159. The mold halves then separate, the plug 180 is lowered, the thread dies 164 and 165 are separated, and a small quantity of air is blown through plug 180 to raise the container 159 just enough to clear the thread die assembly.

Valve 36 is then opened, whereby pressurized air is delivered through air jets 31 to clear the area of base 160 of scrap, crumbs and the like, and through air jet 33 (or 45) to tip the container 159 over onto inclined ramp 50. Container 159 then falls to the bottom of trough 53 and passes through opening 61 into tube 62. The air through jets 31, in addition to cleaning the area of the base will of course exert an additional force on the finished articles urging the same towards the receiving means.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. An apparatus for blow molding preforms into finished articles comprising:
    a heating means for heating said preforms,
    mold means to shape said preforms during the blowing of the preforms into finished articles,
    means to transfer said performs from the heating means to the mold means, and
    discharge means for exerting a generally horizontally directed force on the finished articles in a first generally horizontal direction to move the finished articles in said first generally horizontal direction away from said mold means to a finished article receiving means,
    said mold means including mold halves arranged for relative movement along a second generally horizontal direction between open and closed positions, said second generally horizontal direction being essentially transverse to said first generally horizontal direction, said mold means including means for enclosing between the mold halves at least a portion of said preform in said closed position, and including means for blowing said preform into the shape of a finished article.

2. An apparatus according to claim 1, said mold means mounted on a base at a mold station,
    said base including means for holding the preforms during molding,
    and said discharge means thus moving the finished article in said first generally horizontal direction off of said base towards said receiving means.

3. An apparatus according to claim 2, said force exerting means comprising a means for directing air jets against the finished article.

4. An apparatus according to claim 3, said base including a hollow plug which projects into the bottom of the preform and said means for blowing including means for introducing pressurized air through said plug, and wherein said blowing means includes means for blowing additional air into the finished article to lift the finished article free of said base prior to the discharge of the finished article.

5. An apparatus according to claim 3, said means for directing air jets including at least one first jet at essentially the horizontal level of the base and arranged to blow air across the base and a second jet arranged to blow air against the upper part of the finished article to tip it over toward the receiving means.

6. An apparatus according to claim 3, said means for directing air jets including an air jet located at a height at a part of the finished article spaced from the base and arranged to blow a jet of air horizontally against the finished article.

7. An apparatus according to claim 3, said means for directing air jets including an air jet located at essentially the same height as the said base and arranged to direct air upwardly against the upper part of the finished article.

8. An apparatus according to claim 1, said force exerting means comprising a means for directing air jets against the finished article.

9. A blow molding apparatus of the type for forming an elongated preform into a finished article comprising:
    an oven means for heating said preform,
    a mold means including mold halves arranged for relative movement along a first generally horizontal direction between a separated, opened position and a closed position, said mold means including means for enclosing between the mold halves at least a portion of said preform in a said closed position with the preform extending vertically, and including means for blowing said preform into the shape of a finished article having sides extending generally vertically,
    a transfer means for transferring heated preforms to said mold means,
    and discharge means operable after the mold has moved along said first generally horizontal direction to an opened position for directing at least one air jet against the side of the finished article in a second generally horizontal direction which is generally perpendicular to the first generally horizontal direction to move the finished article in said second generally horizontal direction generally horizontal and generally perpendicular to the first direction out from between the mold halves and to the receiving means.

10. A blow molding apparatus according to claim 9, including a base, means for holding said preform on the base during blow molding, and said means for directing said at least one air jet including at least one first jet located at essentially the vertically level of the base and arranged to blow air across the base, and a second jet arranged to blow air against the upper part of the finished article to tip the finished article over onto the receiving means.

11. A blow molding apparatus according to claim 9, said means for directing at least one air jet including an air jet located at a height at the upper part of the finished article and arranged to blow a jet of air horizontally against the finished article.

12. A blow molding apparatus according to claim 9, including a base, means for holding said preform on the base during blow molding, said means for directing at least one air jet including an air jet located at essentially the same height as the said base and arranged to direct air upwardly against the upper part of the finished article.

13. A blow molding apparatus for forming tubular parisons into containers comprising:
an oven including means for transporting said tubular parisons therethrough and heating the same to an appropriate forming temperature,
a blow mold station comprising a base and a blow mold, said base including means for grasping the bottom of the tubular parison to hold the same during blow molding,
said blow mold comprising a pair of mold halves movable horizontally relative to each other over said base along a first generally horizontal direction to a separated, open position and to a closed position onto the parison while the parison is held by said grasping means, and including means for blowing said parison into the shape of a finished article having sides extending essentially parallel to the direction of elongation of the original tubular parison,
a transfer member for grasping heated parisons at the oven and carrying the same to said grasping means at the base,
and a discharge means for discharging the finished container from the blow mold station to an article receiving means when the mold halves have moved to said separated, open position, said discharge means including force exerting means for exerting a force on the finished container in a second generally horizontal direction which is generally perpendicular to the said first generally horizontal direction to move the finished container in said second generally horizontal direction generally horizontally and generally perpendicular to the said first generally horizontal direction off of the base and to said receiving means.

14. A blow molding apparatus according to claim 13, said force exerting means comprising a means for directing at least one jet of air in said second direction against the side of the container.

15. A blow molding apparatus according to claim 14, said base including a hollow plug which projects up into the bottom of the parison and said means for blowing includes means for introducing pressurized air through said plug into the tubular parison and wherein said blowing means includes means for blowing additional air into the finished container to lift the same free of said base prior to the discharge of the finished container, and said means for directing at least one air jet including at least one first jet at essentially the vertical height of the base and arranged to blow air across the base, and a second jet arranged to blow air against the upper part of the finished container to tip the same over toward the receiving means.

* * * * *